US007669206B2

(12) United States Patent
Sherwani (10) Patent No.: US 7,669,206 B2
(45) Date of Patent: Feb. 23, 2010

(54) DYNAMIC REDIRECTION OF STREAMING MEDIA BETWEEN COMPUTING DEVICES

(75) Inventor: Adil A. Sherwani, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1091 days.

(21) Appl. No.: 10/828,402

(22) Filed: Apr. 20, 2004

(65) Prior Publication Data
US 2005/0262254 A1 Nov. 24, 2005

(51) Int. Cl.
G06F 9/54 (2006.01)
G06F 15/173 (2006.01)
(52) U.S. Cl. ........................ 719/318; 709/223
(58) Field of Classification Search .......... 719/318
See application file for complete search history.

(56) References Cited

U.S. PATENT DOCUMENTS

| 5,140,437 A | 8/1992 | Yonemitsu et al. |
| 5,420,801 A | 5/1995 | Dockter et al. |
| 5,528,281 A | 6/1996 | Grady et al. |
| 5,539,886 A | 7/1996 | Aldred et al. |
| 5,546,584 A | 8/1996 | Lundin et al. |
| 5,574,934 A | 11/1996 | Mirashrafi et al. |
| 5,577,258 A | 11/1996 | Cruz et al. |
| 5,604,843 A | 2/1997 | Shaw et al. |
| 5,625,404 A | 4/1997 | Grady et al. |
| 5,675,752 A | 10/1997 | Scott et al. |
| 5,712,906 A | 1/1998 | Grady et al. |
| 5,764,965 A | 6/1998 | Poimboeuf et al. |
| 5,765,011 A | 6/1998 | Wilkinson et al. |
| 5,786,814 A | 7/1998 | Moran et al. |
| 5,802,283 A | 9/1998 | Grady et al. |
| 5,815,689 A | 9/1998 | Shaw et al. |
| 5,878,431 A | 3/1999 | Potterveld et al. |
| 5,886,274 A | 3/1999 | Jungleib |
| 5,887,139 A | 3/1999 | Madison, Jr. et al. |
| 5,892,767 A | 4/1999 | Bell et al. |
| 5,936,643 A | 8/1999 | Tindell et al. |
| 5,987,628 A | 11/1999 | Von Bokern et al. |

(Continued)

FOREIGN PATENT DOCUMENTS

EP 0784271 A2 7/1997

(Continued)

OTHER PUBLICATIONS

Dunn, et al., "The Design and Implementation of JaDiSM", Nov. 13, 2007, pp. 38.

(Continued)

Primary Examiner—Hyung S Sough
Assistant Examiner—Abdou K Seye
(74) Attorney, Agent, or Firm—Lee & Hayes, PLLC (57) ABSTRACT

Dynamic redirection of streaming media between computing devices is described. In an implementation, a method listening at an application programming interface for a notification indicating that a change is to be made in a topology of streaming media software components. When the notification is received, a media engine that is capable of reconfiguring the topology in accordance with the indicated change is notified. At least one of the topology or the reconfigured topology have one of the streaming media software components located on a comprising device and another one of the streaming media software components located on another computing device.

11 Claims, 6 Drawing Sheets

U.S. PATENT DOCUMENTS

| | | | |
|---|---|---|---|
| 5,995,512 | A | 11/1999 | Pogue, Jr. |
| 5,996,015 | A | 11/1999 | Day et al. |
| 6,014,706 | A | 1/2000 | Cannon et al. |
| 6,038,625 | A | 3/2000 | Ogino et al. |
| 6,044,408 | A | 3/2000 | Engstrom et al. |
| 6,178,172 | B1 | 1/2001 | Rochberger |
| 6,185,612 | B1 | 2/2001 | Jensen et al. |
| 6,192,354 | B1 | 2/2001 | Bigus et al. |
| 6,209,041 | B1 | 3/2001 | Shaw et al. |
| 6,243,753 | B1 | 6/2001 | Machin et al. |
| 6,262,776 | B1 | 7/2001 | Griffits |
| 6,263,486 | B1 | 7/2001 | Boezeman et al. |
| 6,266,053 | B1 | 7/2001 | French et al. |
| 6,279,029 | B1 | 8/2001 | Sampat et al. |
| 6,308,216 | B1 | 10/2001 | Goldszmidt et al. |
| 6,317,131 | B2 | 11/2001 | Basso et al. |
| 6,321,252 | B1 | 11/2001 | Bhola et al. |
| 6,343,313 | B1 | 1/2002 | Salesky et al. |
| 6,347,079 | B1 | 2/2002 | Stephens et al. |
| 6,369,835 | B1 | 4/2002 | Lin |
| 6,385,201 | B1 | 5/2002 | Iwata |
| 6,389,467 | B1 | 5/2002 | Eyal |
| 6,430,526 | B1 | 8/2002 | Toll |
| 6,466,971 | B1 | 10/2002 | Humpleman et al. |
| 6,536,043 | B1 | 3/2003 | Guedalia |
| 6,539,163 | B1 | 3/2003 | Sheasby et al. |
| 6,546,426 | B1 | 4/2003 | Post |
| 6,549,932 | B1 | 4/2003 | McNally et al. |
| 6,581,102 | B1* | 6/2003 | Amini et al. ............. 709/231 |
| 6,594,699 | B1 | 7/2003 | Sahai et al. |
| 6,594,773 | B1 | 7/2003 | Lisitsa et al. |
| 6,618,752 | B1 | 9/2003 | Moore et al. |
| 6,625,643 | B1 | 9/2003 | Colby et al. |
| 6,658,477 | B1 | 12/2003 | Lisitsa et al. |
| 6,684,331 | B1 | 1/2004 | Srivastava |
| 6,687,664 | B1 | 2/2004 | Sussman et al. |
| 6,691,312 | B1 | 2/2004 | Sen et al. |
| 6,694,368 | B1 | 2/2004 | An et al. |
| 6,711,171 | B1 | 3/2004 | Dobbins et al. |
| 6,725,274 | B1* | 4/2004 | Slik ............. 709/231 |
| 6,725,279 | B1 | 4/2004 | Richter et al. |
| 6,757,735 | B2 | 6/2004 | Apostolopulos et al. |
| 6,802,019 | B1 | 10/2004 | Lauder |
| 6,810,526 | B1 | 10/2004 | Menard et al. |
| 6,823,225 | B1 | 11/2004 | Sass |
| 6,920,181 | B1 | 7/2005 | Porter |
| 6,957,430 | B2 | 10/2005 | Fant et al. |
| 6,975,752 | B2 | 12/2005 | Dixon et al. |
| 7,024,483 | B2 | 4/2006 | Dinker et al. |
| 7,035,858 | B2 | 4/2006 | Dinker et al. |
| 7,047,554 | B1 | 5/2006 | Lortz |
| 7,076,564 | B2 | 7/2006 | To et al. |
| 7,124,424 | B2 | 10/2006 | Gordon et al. |
| 7,139,925 | B2 | 11/2006 | Dinker et al. |
| 7,197,535 | B2 | 3/2007 | Salesky et al. |
| 7,206,854 | B2 | 4/2007 | Kauffman et al. |
| 7,240,325 | B2 | 7/2007 | Keller |
| 7,246,318 | B2 | 7/2007 | Debique et al. |
| 7,290,057 | B2 | 10/2007 | Saunders et al. |
| 7,299,485 | B2 | 11/2007 | Chaney et al. |
| 7,330,542 | B2 | 2/2008 | Kauhanen et al. |
| 7,415,537 | B1 | 8/2008 | Maes |
| 7,426,637 | B2 | 9/2008 | Risan et al. |
| 2001/0000962 | A1 | 5/2001 | Rajan |
| 2001/0024455 | A1 | 9/2001 | Thaler et al. |
| 2002/0051017 | A1 | 5/2002 | Wishoff |
| 2002/0085581 | A1 | 7/2002 | Hauck et al. |
| 2002/0123997 | A1 | 9/2002 | Loy et al. |
| 2002/0158897 | A1 | 10/2002 | Besaw et al. |
| 2002/0174425 | A1 | 11/2002 | Markel et al. |
| 2002/0199031 | A1 | 12/2002 | Rust et al. |
| 2003/0028643 | A1 | 2/2003 | Jabri |
| 2003/0033424 | A1 | 2/2003 | Gould |
| 2003/0056029 | A1 | 3/2003 | Huang et al. |
| 2003/0093568 | A1 | 5/2003 | Deshpande |
| 2003/0095504 | A1 | 5/2003 | Ogier |
| 2003/0101253 | A1* | 5/2003 | Saito et al. ............. 709/223 |
| 2003/0123659 | A1 | 7/2003 | Forstrom et al. |
| 2003/0146915 | A1 | 8/2003 | Brook et al. |
| 2003/0149772 | A1 | 8/2003 | Hsu et al. |
| 2003/0158957 | A1 | 8/2003 | Abdolsalehi |
| 2003/0177292 | A1 | 9/2003 | Smirnov et al. |
| 2003/0215214 | A1 | 11/2003 | Ma |
| 2003/0231867 | A1 | 12/2003 | Gates et al. |
| 2003/0236892 | A1 | 12/2003 | Coulombe |
| 2003/0236906 | A1 | 12/2003 | Klemets et al. |
| 2004/0001106 | A1 | 1/2004 | Deutscher et al. |
| 2004/0004631 | A1 | 1/2004 | Debique et al. |
| 2004/0031058 | A1* | 2/2004 | Reisman ............. 725/112 |
| 2004/0042413 | A1 | 3/2004 | Kawamura et al. |
| 2004/0073596 | A1 | 4/2004 | Kloninger et al. |
| 2004/0073912 | A1 | 4/2004 | Meza |
| 2004/0080504 | A1 | 4/2004 | Salesky et al. |
| 2004/0139157 | A1 | 7/2004 | Neely, III et al. |
| 2004/0177162 | A1 | 9/2004 | Wetzel et al. |
| 2004/0207723 | A1 | 10/2004 | Davis et al. |
| 2004/0208132 | A1* | 10/2004 | Neulist et al. ............. 370/252 |
| 2004/0220926 | A1 | 11/2004 | Lamkin et al. |
| 2004/0230659 | A1 | 11/2004 | Chase |
| 2004/0236945 | A1 | 11/2004 | Risan et al. |
| 2004/0267778 | A1 | 12/2004 | Rudolph et al. |
| 2004/0267899 | A1 | 12/2004 | Rahman et al. |
| 2004/0267953 | A1 | 12/2004 | Dunbar et al. |
| 2004/0268224 | A1 | 12/2004 | Balkus et al. |
| 2004/0268357 | A1 | 12/2004 | Joy et al. |
| 2004/0268407 | A1 | 12/2004 | Sparrell et al. |
| 2005/0005025 | A1 | 1/2005 | Harville et al. |
| 2005/0018775 | A1 | 1/2005 | Subramanian et al. |
| 2005/0055517 | A1 | 3/2005 | Olds et al. |
| 2005/0066082 | A1 | 3/2005 | Forin et al. |
| 2005/0081158 | A1 | 4/2005 | Hwang |
| 2005/0125734 | A1 | 6/2005 | Mohammed et al. |
| 2005/0132168 | A1 | 6/2005 | Weiss et al. |
| 2005/0188311 | A1 | 8/2005 | Diesel et al. |
| 2005/0198189 | A1 | 9/2005 | Robinson et al. |
| 2005/0204289 | A1 | 9/2005 | Mohammed et al. |
| 2005/0226324 | A1 | 10/2005 | Ouyang et al. |
| 2005/0262254 | A1 | 11/2005 | Sherwani |
| 2007/0011321 | A1 | 1/2007 | Huntington et al. |
| 2008/0037957 | A1 | 2/2008 | Nallur et al. |
| 2008/0154407 | A1 | 6/2008 | Carson |

FOREIGN PATENT DOCUMENTS

| | | |
|---|---|---|
| EP | 0814403 A1 | 12/1997 |
| JP | 2002514797 | 5/2002 |
| WO | WO9621189 A1 | 7/1996 |
| WO | WO9957837 A2 | 11/1999 |

OTHER PUBLICATIONS

Timothy K. Shih, "Participator Dependent Multimedia Presentation," Journal of Information Sciences, vol. 107, 1998, pp. 85-105.

Timothy K. Shih and Wen C. Pai, "A Stepwise Refinement Approach to Multimedia Presentation Designs," IEEE, 1997, pp. 117-122.

Arbab Ali Samejo et al., "Graphical User Interface Based Multimedia Web Suite in Windows Evironment," Mehran Unversity Research Journal of Engineering & Technology, vol. 20, No. 2, Apr. 2001, pp. 57-68.

Timothy Shih, et al., "A Knowledge Abstraction Approach for Multimedia Presentation," IEEE, 1997, pp. 528-532.

Sei-Hoon Lee and Chang-Jong Wang, "Open Multimedia/ Hypermedia Application Development Environment," Inspec, 1996, 5 pages.

Chi-Ming Chung, et al., "A Control and Data Abstraction Approach for Multimedia Presentation," Journal of the Chinese Institute of Electrical Engineering, vol. 5, No. 3, 1998, pp. 265-276.

Robertson, Mark A. et al., "Temporal Resolution Enhancement in Compressed Video Sequences," University of Notre Dame, Notre Dame, Indiana; Sep. 2001; pp. 1-11.

Girod, Bernd et al., "Feedback-Based Error control for Mobile Video Transmission," Proceedings of the IEEE, vol. 87, No. 10, Oct. 1999; pp. 1707-1723.

Chien, Shao-Yi; et al., "Multiple Sprites and Frame Skipping Techniques for Sprite Generation with High Subjuctive Quality and Fast Speed," IEEE 2002; pp. 785-788.

Olson, Robert, et al., "Remote Rendering Using Vtk and Vic," website at http://www-unix.mcs.anl.gov/fl/publications/vis00-vicvtk.pdf, 2 pages.

Engel, Klaus et al, "Remote 3D Visualization Using Image-Streaming Techniques," website at: http://citeseer.nj.nec.com/394248.html, 4 pages.

Engel, K., et al., "Combining Local and Remote Visualization Techniques for Interactive Volume Rendering in Medical Applications" website at http://wwwvis.informatik.uni-stuttgart.de/eng/research/pub/pub2000/engel_vis00.pdf.

TGS website at http://www.tgs.com/pro_div/oiv_overview.htm, "Open Inventor from TGS4.0 / Open Inventor Overview: Object-Oriented 3D Graphics Developers Toolkit" printed Apr. 28, 2003, 4 pages.

Barth, et al., "Configuring Distributed Multimedia Applications Using CINEMA", retrieved on Jan. 19, 2008 at <<http://ieeeexplore.ieee.org/xpls/absprintf.jsp?arnumber=557748>> Published 2006, pp. 10.

Blome, et al., "Core Media Technology in Windows XP Empowers You to Create Custom Audio/Video Processing Components", retrieved on Sep. 22, 2009 at <<http://msdn.microsoft.com/en-us/magazine/cc301631.aspx>>, MSDN Magazine, 16 pages.

"DirectShow", retrieved on Sep. 22, 2009 at <<http://www.gdcl.co.uk/dshow.htm>>, Archived Oct. 17, 2002, 12 pages.

"EvCode.h", retrieved on Sep. 22, 2009 at <<http://www.lelandnsmith.com/downloads/Microsoft/DirectX%209%20SDK/sdk/Include/evcode.h>>, Microsoft, 2001, pp. 1-6.

"GstEvent", retrieved on Sep. 22, 2009 at <<http://www.gstreamer.net/docs/gstreamer/gstreamer-bstevent.html>>, GStreamer Core Reference Manual, Archived Apr. 29, 2003, pp. 1-14.

"IFileSourceFilter Interface", retrieved on Sep. 22, 2009 at <<http://msdn.microsoft.com/en-us/library/dd389981(VS.85, printer).aspx>>, MSDN, Microsoft, Jul. 13, 2009, 4 pages.

Taymans, et al., "GStreamer Application Development Manual", retrieved on Sep. 22, 2009 at <<http://www.gstreamer.net/docs/gstreamer-manual.pdf>>, Archived Apr. 5, 2003, pp. i-iv and 1-84.

Thompson, "DirectShow for Media Playback In Windows", retrieved on Sep. 22, 2009 at <<http://www.flipcode.com/archives/DirectShow_For_Media_Playback_In_Windows-Part_I_Basics.shtml>>, Parts 1-3, Last Part Dated Sep. 13, 200, 18 pages.

Agarwal, et al., "The Totem Multiple-Ring Ordering and Topology Maintenance Protocol", ACM, vol. 16, No. 2, 1998, pp. 93-132.

Bao, et al., "Topology Management in Ad Hoc Networks", ACM, 2003, pp. 129-140.

Jaffe, et al., "Automatic Update of Replicated Topology Data Base", ACM, 1984, pp. 142-148.

Sullivan, et al., "Programming with the Java Media Framework", Sean C. Sullivan, Loren Winzeler, Jeanine Deagen, and Deanna Brown, 1998, pp. 99.

Chatterjee, et al., "Microsoft DirectShow: A New Media Architecture", SMPTE Journal, Dec. 1997, pp. 865-871.

Cline, et al., "DirectShow RTP Support for Adaptivity in Networked Multimedia Applications", IEEE, 1998, pp. 13-22.

* cited by examiner

DYNAMIC REDIRECTION OF STREAMING MEDIA BETWEEN COMPUTING DEVICES

TECHNICAL FIELD

The present invention generally relates to streaming media, and more particularly relates to dynamic redirection of streaming media between computing devices.

BACKGROUND

Users of computing devices, such as desktop personal computers (PCs), set-top boxes, personal digital assistants (PDAs), and so on, have access to an ever increasing amount of media from an ever increasing variety of sources. For example, a user may interact with a desktop PC that executes a plurality of applications to provide media for output, such as home videos, songs, slideshow presentations, and so on. The user may also utilize a set-top box to receive traditional television programming that is broadcast to the set-top box over a broadcast network. Additionally, the set-top box may be configured as a digital video recorder (DVR) such that the user may store the broadcast media in memory on the set-top box for later playback. Further, the user may interact with a wireless phone that executes a plurality of applications such that the user may read and send email, play video games, view spreadsheets, and so forth.

Streaming media provides increased functionality to a user such that the user may quickly receive the media. Without streaming, if the entire amount of the media was needed to be received from a source device before it was output by a client device, the user may experience a delay in rendering the media at the client device. By streaming the media, the delay encountered by the user may be lessened. Thus, media streaming may be used to provide "real-time" rendering of data.

To stream media, media is transmitted from a source device in a streaming or continuous fashion, generally using data packets, for rendering at a client device as the data arrives, as opposed to media that is not rendered until an entire file which includes the media is available at the client device. Streaming may be used for a variety of types of media, such as video media, audio media, multimedia, and the like. A stream of video media provides a sequence of "moving images" that are transmitted and displayed when the images arrive. Likewise, a stream of audio provides sound data that is played as the audio media arrives. A stream of multimedia may include both audio and video media.

Because the user may have access to a wide variety of computing devices on which to experience rendered streaming media, the user may wish to change from interacting with streaming media on one computing device to another computing device. For instance, the user may watch a television program that is stored on a digital video recorder (DVR) in a living room. The television program is output by the DVR for rendering by a display device in the living room such that the user may view and listen to the television program. During the output of the television program, however, the user may wish to view and listen to the television program utilizing another television located in the user's kitchen. Traditional methods utilized to accomplish this task required the user to select hardware and software components for transferring the television program and required the user to manually navigate to the point in interest in the output of the television program. Thus, the user could not dynamically redirect the streaming media from one computing device to another computing device.

Accordingly, there is a continuing need for dynamic redirection of streaming media between computing devices.

SUMMARY

Dynamic redirection of streaming media between computing devices is described. For example, media may be streamed from a source device to a rendering device locally on a server. During the streaming, a user may move to another client that is communicatively coupled to the server over a network. The streaming media may be redirected in response to the change by the user such that the user does not experience an interruption in the streaming of the media.

In an implementation, a method includes listening at an application programming interface for a notification indicating that a change is to be made in a topology of streaming media software components. When the notification is received, a media engine that is capable of reconfiguring the topology in accordance with the indicated change is notified. At least one of the topology or the reconfigured topology have one of the streaming media software components located on a computing device and another one of the streaming media software components located on another computing device.

In an additional implementation, a method includes listening at an application programming interface for a notification indicating that a change is to be made to a first topology of software components. The first topology of software components is capable of streaming media and has an execution state relative to the streaming media. The first topology is reconfigured in accordance with the indicated change to form a second topology. The second topology is initialized to have an execution state that matches the execution state of the first topology. At least one of the first or the second topology have software components that are distributed on a plurality of computing devices.

BRIEF DESCRIPTION OF THE DRAWINGS

The same numbers are used throughout the disclosure and figures to reference like components and features.

DETAILED DESCRIPTION

Overview

Dynamic redirection of streaming media is described. Streaming media may be provided using a topology of software components that may be configured for local rendering of the media on a single computing device. The topology may also be configured for the streaming of the media utilizing a plurality of computing devices. For example, software components may be provided in a distributed topology that includes a server and a client. The distributed topology may be thought of as a software framework or plan for streaming data from the source device to the client over the network using the referenced software components. The distributed topology of software components may be utilized by a wide variety of applications, operating systems, and so on, to cause media to be streamed over a network without having to "know" the details (such as locations of the source and destination, format conversions, etc.) of how the media was streamed.

A terminal services (TS) application, for instance, may be utilized to allow a user of a personal computer (PC) (which in this instance is the "client") to remotely access a desktop of another PC and execute applications on the second PC (which in this instance is the "server") as if the user were physically located at the server. To render media using a TS application that utilizes the distributed topology inside a terminal services session, the distributed topology streams the media from the server to the client and renders the media on the client.

Because streaming media may be provided in a variety of local and remote scenarios, it is desirable to enable the user to change from one scenario to another. For example, a scenario may be encountered in which the user disconnects the TS session from the client without shutting down the media application that was being executed on the server. In this instance, the server no longer has a connection to the client and therefore cannot continue to stream media over the network to the client. Therefore, the distributed topology may be reconfigured to a local topology to render the streaming media locally on the server instead of streaming the media to the client over the network. A variety of other scenarios may also be encountered in which streaming media is redirected. For example, a media player application may render media on the server. During the rendering, the user connects to the server via a TS application from the client and in response to the connection the streaming media is redirected from the server to the client. In other words, the streaming media is redirected from a local scenario that involves the execution of a topology of local software components on the server to a remote scenario that involves the execution of a distributed topology of software components that are distributed across a plurality of computing devices.

In another example, the user is located at a client which renders media from the server inside a terminal services session. During the rendering, the user moves to another client and connects to the same server, thereby canceling the prior TS connection between the server and the previous client. In this scenario, the streaming media is redirected from the previous client to the other client, e.g. from using a first distributed topology of software components to a second distributed topology of software components. In a further example, a user is located at a server that renders media locally on the server. During the rendering, the user may add a TS shadow client, so that both the local user as well as another user using the TS shadow client can simultaneously view the desktop of the server and the media being rendered from the server. Therefore, in this example the local topology is reconfigured as a distributed topology that supports both local and remote rendering of the streaming media. Additional examples of redirection in remote and/or local topologies may be found in relation to FIG. 6. In the following discussion, an exemplary environment is described in relation to FIGS. 1-3 which is then followed by a discussion of exemplary procedures in relation to FIGS. 4-6 which may be implemented using the exemplary environment.

Exemplary Environment

Figure 1:
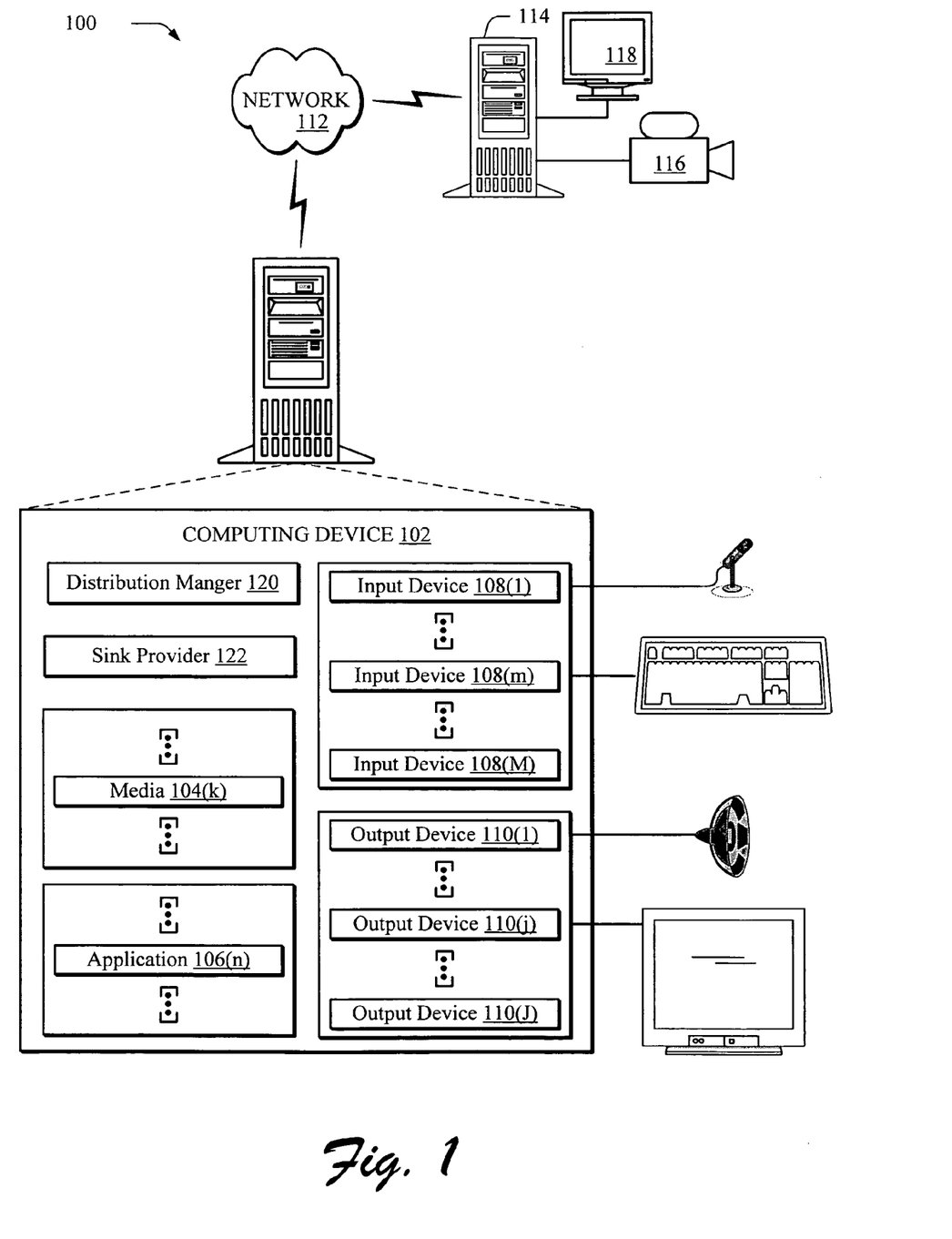
FIG. 1 is an illustration of an environment in an exemplary implementation in which a computing device provides access to a plurality of media over a network.

FIG. 1 is an illustration of an environment 100 in an exemplary implementation in which a computing device 102 provides access to a plurality of media. The computing device 102, as illustrated, is configured as a personal computer (PC). The computing device 102 may also assume a variety of other configurations, such as a mobile station, an entertainment appliance, a set-top box communicatively coupled to a display device, a wireless phone, a video game console, a personal digital assistant (PDA), and so forth. Thus, the computing device 102 may range from a full resource device with substantial memory and processor resources (e.g., PCs, television recorders equipped with hard disk) to a low-resource device with limited memory and/or processing resources (e.g., a traditional set-top box).

The computing device 102 may obtain a variety of media from a variety of media sources. For example, the computing device 102 may locally store a plurality of media 104(k), where "k" can be any integer from one to "K". The plurality of media 104(k) may include an assortment of audio and video content having various formats, such as WMV, WMA, MPEG 1, MPEG 2, MP3, and so on. Further, the media 104(1)-104(K) may be obtained from a variety of sources, such as from an input device, from execution of an application, and so on.

The computing device 102, for instance, may include a plurality of applications 106(n), where "n" can be any integer from one to "N". One or more of the plurality of applications 106(n) may be executed to provide media, such as documents, spreadsheets, video, audio, and so on. Additionally, one or more of the plurality of applications 106(n) may be configured to provide media interaction, such as encoding, editing, and/or playback of the media 104(k).

The computing device 102 may also include a plurality of input devices 108(1), . . . , 108(m), . . . , 108(M). One or more of the plurality of input devices 108(1)-108(M) may be configured to provide media for input to the computing device 102. Input device 108(1), for instance, is illustrated as a microphone that is configured to provide an input of audio data, such as a voice of the user, a song at a concert, and so on. The plurality of input devices 108(1)-108(M) may also be configured for interaction by a user to provide inputs that control execution of the plurality of applications 106(n). For example, input device 108(1) may be utilized to input voice commands from the user, such as to initiate execution of a particular one of the plurality of applications 106(n), control execution of the plurality of applications 106(n), and so forth. In another example, input device 108(m) is illustrated as a keyboard that is configured to provide inputs to control the computing device 102, such as to adjust the settings of the computing device 102.

Further, the computing device 102 may include a plurality of output devices 110(1), . . . , 110(j), . . . , 110(J). The output devices 110(1)-110(J) may be configured to render media 104(k) for output to the user. For instance, output device 110(1) is illustrated as a speaker for rendering audio data. Output device 110(j) is illustrated as a display device, such as a television, that is configured to render audio and/or video data. Thus, one or more of the plurality of media 104(k) may be provided by the input devices 108(1)-108(M) and stored locally by the computing device 102. Although the plurality of input and output devices 108(1)-108(M), 110(1)-110(J) are illustrated separately, one or more of the input and output devices 108(1)-108(M), 110(1)-100(J) may be combined into a single device, such as a television having buttons for input, a display device, and a speaker.

The computing device 102 may also be configured to communicate over a network 112 to obtain media that is available remotely over the network 112. The network 112 is illustrated as the Internet, and may include a variety of other networks, such as an intranet, a wired or wireless telephone network, a broadcast network, and other wide area networks. A remote computing device 114 is communicatively coupled to the network 112 such that the remote computing device 114 may provide media to the computing device 102. For example, the remote computing device 114 may include one or more applications and a video camera 116 that provides media, such as home movies. The remote computing device 114 may also include an output device to output media, such as the display device 118 as illustrated. The media obtained by the computing device 102 from the remote computing device 114 over the network 112 may be stored locally with the media 104(k). In other words, media 104(k) may include locally stored copies of media obtained from the remote computing device 114 over the network 112. In the following discussion, the terms "server" and "client" may be utilized to reference a computing device that provides media and a computing device that renders media, respectively. Thus, the terms "server" and "client" do not necessarily denote the amount of hardware, software, and/or network resources of the respective computing devices, but rather are utilized to reference the flow of the streaming media.

Figure 2:
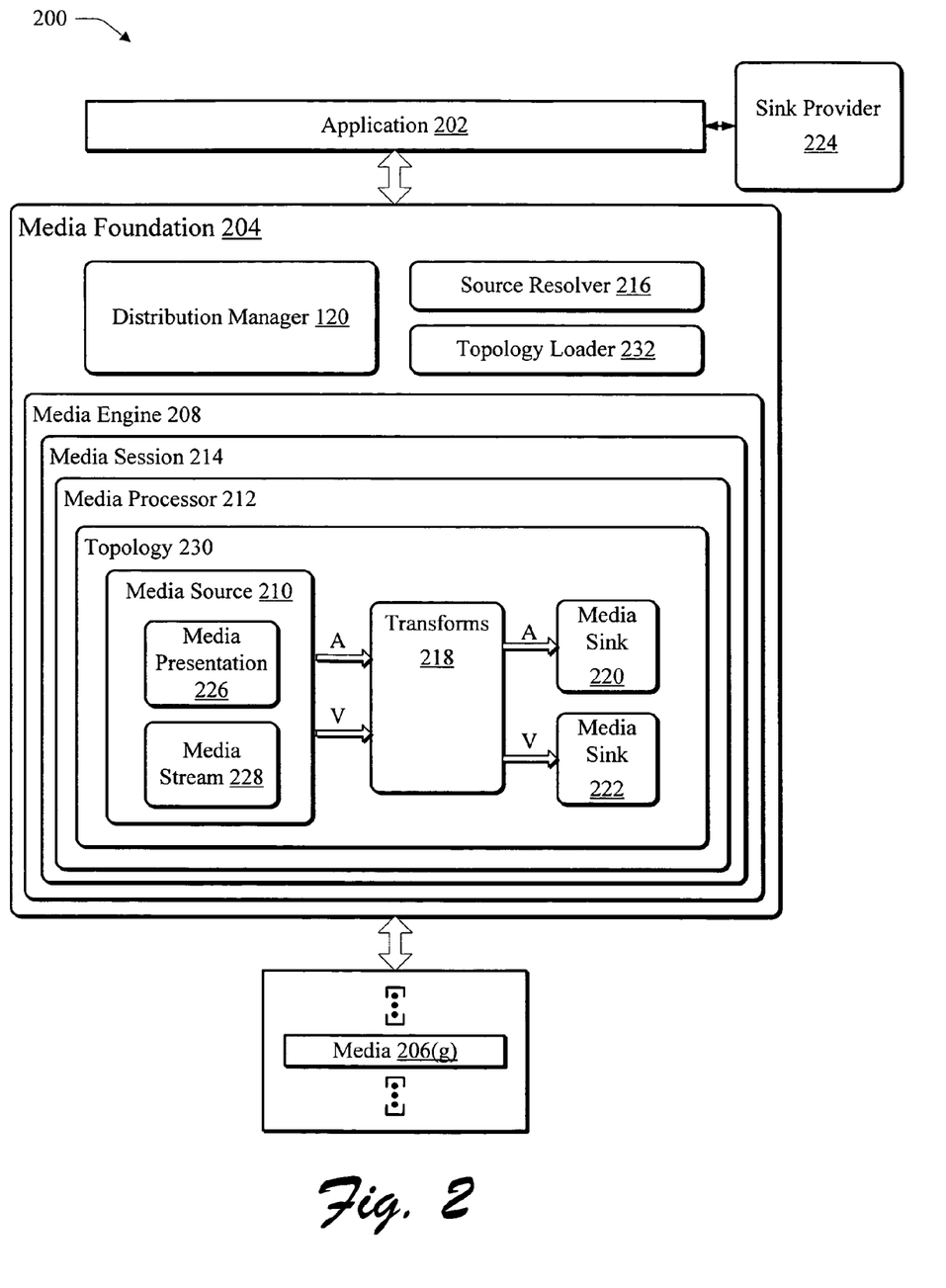
FIG. 2 is a high level block diagram of a system in an exemplary implementation in which the system, implemented in software, includes an application that interacts with a media foundation to control presentation of media.

As shown in FIG. 2, the computing device 102 may obtain and store a plurality of media 104(k) that may be provided both locally (e.g., through execution of the plurality of applications 106(n) and/or use of the plurality of input device 108(1)-108(M)), and remotely from the remote computing device 114 (e.g., through execution of application and/or use of input devices). Although the plurality of media 104(k) has been described as stored on the computing device 102, the media 104(k) may also be provided in "real-time". For example, audio data may be streamed from the input device 108(1), which is illustrated as a microphone, without storing the audio data.

The computing device 102 also includes a distribution manager 120 and a sink provider 122. The distribution manager 120, when executed on the computing device 102, is responsible for setting up connections between software components that are utilized to stream data from the computing device 102 to the remote computing device 114. The sink provider 122, when executed on the computing device 102, provides information for constructing software components that render the media stream, further discussion of which may be found in relation to FIGS. 2 and 3. Additionally, the sink provider 122 may "listen" for notifications of changes that are to be made to the software components, such as to redirect a stream of media from a first computing device to another computing device, and so on. Further discussion of the distribution of software components to stream media in a distributed environment may be found in relation to FIG. 3. Further discussion of the redirection of a stream of media in a distributed environment may be found starting in relation to FIG. 4.

FIG. 2 is a high level block diagram of a system 200 in an exemplary implementation in which the system 200, implemented in software, includes an application 202 that interacts with a media foundation 204 to control presentation of a plurality of media 206(g), where "g" can be any number from one to "G". The media 206(g) may be provided from a variety of sources, such as from the media 104(1)-104(K) of FIG. 1, through execution of the applications 106(1)-106(N), use of the input devices 108(1)-108(M), output devices 110(1)-100(J), and so on.

The application 202, which may be the same as or different from applications 106(1)-106(N) of FIG. 1, interacts with a media engine 208 to control the media 104(1)-104(K). In at least some embodiments, the media engine 208 serves as a central focal point of the application 202 that desires to somehow participate in a presentation. A presentation, as used in this document, refers to or describes the handling of media. In the illustrated and described embodiment, a presentation is used to describe the format of the data on which the media engine 208 is to perform an operation. Thus, a presentation can result in visually and/or audibly presenting media, such as a multimedia presentation in which both audio and accompanying video is presented to user within a window rendered on a display device, such as output device 110(j) of FIG. 1 that is illustrated as a display device that may be associated with a desktop PC. A presentation can also result in writing media content to a computer-readable medium such as a disk file. Thus, a presentation is not limited to scenarios in which multimedia content is rendered on a computer. In some embodiments, operations such as decoding, encoding and various transforms (such as transitions, effects and the like), can take place as a result of a presentation.

In an embodiment, the media foundation 204 exposes one or more application program interfaces that can be called by the application 202 to interact with the media 206(g). For example, the media foundation 204 may be thought of as existing at an "infrastructure" level of software that is executed on the computing device 102 of FIG. 1. In other words, the media foundation 204 is a software layer used by the application 202 to interact with the media 206(g). The media foundation 204 may be utilized to control a number of aspects of the media 206(g), such as output, rendering, storage, and so on. Thus, the media foundation 204 may be utilized such that each application 202 does not have to implement separate code for each type of media 206(g) that may be used in the system 200. In this way, the media foundation 204 provides a set of reusable software components to do media specific tasks.

In an implementation, the media foundation 204 may be included as a part of an operating system to provide playback of the media 206(g) such that applications that interact with the operating system may control playback of the media 206(g) without "knowing" the particular details of the media formats. In another implementation, the media foundation 204 may be utilized by the operating system such that the operating system may also control playback of the media 206(g) without "knowing" the particular details of the media formats. Thus, the media foundation 204 may act as an infrastructure layer between the media 206(g) and the application 202, operating system, and so on.

The media foundation 202 may utilize several components among which include the distribution manager 120, a media source 210, a media processor 212, a media session 214, the media engine 208, a source resolver 216, one or more transforms 218, one or more media sinks 220, 222, a destination representation 224, and so on. One advantage of various illustrated and described embodiments is that the system 200 is a pluggable model in the sense that a variety of different kinds of components can be utilized in connection with the systems described herein.

Also included as a part of system 200 is the destination representation 224, which corresponds to the sink provider 122 of FIG. 1. In at least one embodiment, the destination representation 224 is a software object that defines where a presentation is to be presented (e.g. a window, disk file, and the like) and what happens to the presentation. That is, the destination representation 224 may provide information used to create the one or more of the media sinks 220, 222 into which data flows. Therefore, the terms destination representation 224 and sink provider 122 may be utilized in different instances in the following discussion to reflect the functionality of representing the destination for the media stream and providing information to create a media sink, respectively.

The destination representation 224 may abstract a destination for streaming media that is located on another computing device, e.g. remote computing device 114 of FIG. 1, or on the same computing device. Although the destination representation 224 is illustrated separately from the media foundation 204 to depict that the application 202 may communicate directly with the destination representation 224 (i.e., the destination representation may be exposed to the application 202), the destination representation 224 may be considered a software component of the media foundation 204.

The media source 210 is utilized to abstract a provider of media. The media source 210, for instance, may be configured to read a particular type of media from a particular source. For example, one type of media source might capture video from the outside world (a camera), and another might capture audio (a microphone). Alternately or additionally, the media source 210 may read a compressed data stream from disk and separate the data stream into its compressed video and compressed audio components. Yet another media source 210 might obtain data from the network 112 of FIG. 1. Thus, the media source 210 may be utilized to provide a consistent interface to acquire media.

The media source 210 provides one or more media presentation 226 objects (media presentation). The media presentation 226 abstracts a description of a related set of media streams. For example, the media presentation 226 may provide a paired audio and video stream for a movie. Additionally, the media presentation 226 may describe the configuration of the media source 210 at a given point in time. The media presentation 226, for instance, may contain information about the media source 210 including descriptions of the available streams of the media source 210 and their media types, e.g. audio, video, MPEG, and so on.

The media source 210 may also provide a media stream 228 object (media stream) which may represent a single stream from the media source 210 which can be accessed by the application 202, i.e. exposed to the application 202. The media stream 228 thus allows the application 202 to retrieve samples of the media 206(g). In an implementation, the media stream 228 is configured to provide a single media type. A media source can provide more than one media stream. For example, a file can provide both audio and video data. The media source for this file may therefore provide two streams, one for audio and the other for video. In the media foundation 204, the media source 210 is defined as a software component which outputs samples for a presentation.

The media processor 212 manages data flow in a topology 230. The topology 230 defines how data flows through various components for a given presentation. A "full" topology includes each of the components, e.g. software modules, used to manipulate the data such that the data flows with the correct format conversions between different components. When a topology is created, the user and/or application 202 might choose to create it partially. This partial topology is not sufficient, by itself, to provide a final presentation. Therefore, a component called the topology loader 232 may take the partial topology and convert it into a full topology by adding the appropriate data conversion transforms between the components in the partial topology.

In the topology 230, for example, data generally originates at the media source 210, flows through one or more transforms 218, and proceeds into one or more media sinks 220, 222. Transforms 218 can include any suitable data handling components that are typically used in presentations. Such components can include those that uncompress compressed data and/or operate on data in some way, such as by imparting an effect to the data, as will be appreciated by the skilled artisan. For example, for video data, transforms can include those that affect brightness, color conversion, and resizing. For audio data, transforms can include those that affect reverberation and re-sampling. Additionally, decoding and encoding can be considered as transforms.

Media sinks 220, 222 are typically associated with a particular type of media content. Thus, audio content might have an associated audio sink such as an audio renderer. Likewise, video content might have an associated video sink such as a video renderer. Additional media sinks can send data to such things as computer-readable media, e.g. a disk file and the like, stream the data over the network, such as broadcasting a radio program, and so on.

The media session 214 is a component which may schedule multiple presentations. Therefore, the media processor 212 may be used to drive a given presentation, and the media session 214 utilized to schedule multiple presentations. The media session 214, for instance, may change topologies that are rendered by the media processor 212. For example, the media session 214 may change from a first topology that is rendered on the media processor 212 to a second topology such that there is no gap between the renderings of samples from the consecutive presentations that are described by the respective topologies. Thus, the media session 214 may provide a seamless user experience as the playback of the media moves from one presentation to another.

The source resolver 216 component may be utilized to create a media source 210 from URLs and/or byte stream objects. The source resolver 216 may provide both synchronous and asynchronous ways of creating the media source 210 without requiring prior knowledge about the form of data produced by the specified resource.

In at least one embodiment, the media foundation 204 is utilized to abstract away the specific details of the existence of and interactions between various components of the media foundation 204. That is, in some embodiments, the components that are seen to reside inside the media foundation 204 are not visible, in a programmatic sense, to the application 202. This permits the media foundation 202 to execute so-called "black box" sessions. For example, the media engine 208 can interact with the media session 214 by providing the media session certain data, such as information associated with the media (e.g. a URL) and the destination representation 224, and can forward the application's 202 commands (e.g. open, start, stop and the like) to the media session 214. The media session 214 then takes the provided information and creates an appropriate presentation using the appropriate destination. Thus, the media foundation 204 may expose a plurality of software components that provide media functionality over an application programming interface for use by the application 202.

To create the topology 230, the destination representation 224 is created for the presentation. As previously described, the destination representation 224 represents the destination for the media stream and may be utilized to create media sinks to sink the media stream. The destination representation 224 may be created in a variety of ways, such as passed by the application 202 to the media engine 208, created by the media engine 208 itself, and so forth. An open call is then received at the media engine 208 from the application 202 to open one or more media for streaming.

If needed, the media engine 208 resolves the media source 210. Source resolution is the process by which the media engine 208 causes the appropriate media source 210 (e.g., one that can read the particular type of data that is to be read) to be created. The application 202, for instance, may provide a URL that is utilized by the media engine 208 to create a media source 208. In another example, the application 202 creates the media source 208 and provides it to the media engine 208. Next, the media session 214 is created using the media source 210. Multiple media sessions 214 may be created in the event there are multiple media sources 208.

If a topology 230 has not been specified by the application 202, for instance, then the media engine 208 performs a partial topology resolution using either the destination representation 224 provided by the application 202, or if no destination was provided, using an implementation of the destination representation 224 designed for playback through default outputs. A full topology is then resolved from the partial topology by specifying software components that, when executed, provide the media stream.

If the application 202 has specified a topology, then the topology 230 for the presentation is activated and a "media opened" event is sent by the media engine 208 to the application 202. The "media opened" event notifies the application 202 that it can now control the progress of the presentation by, for example, calling methods on the media engine 208.

Figure 3:
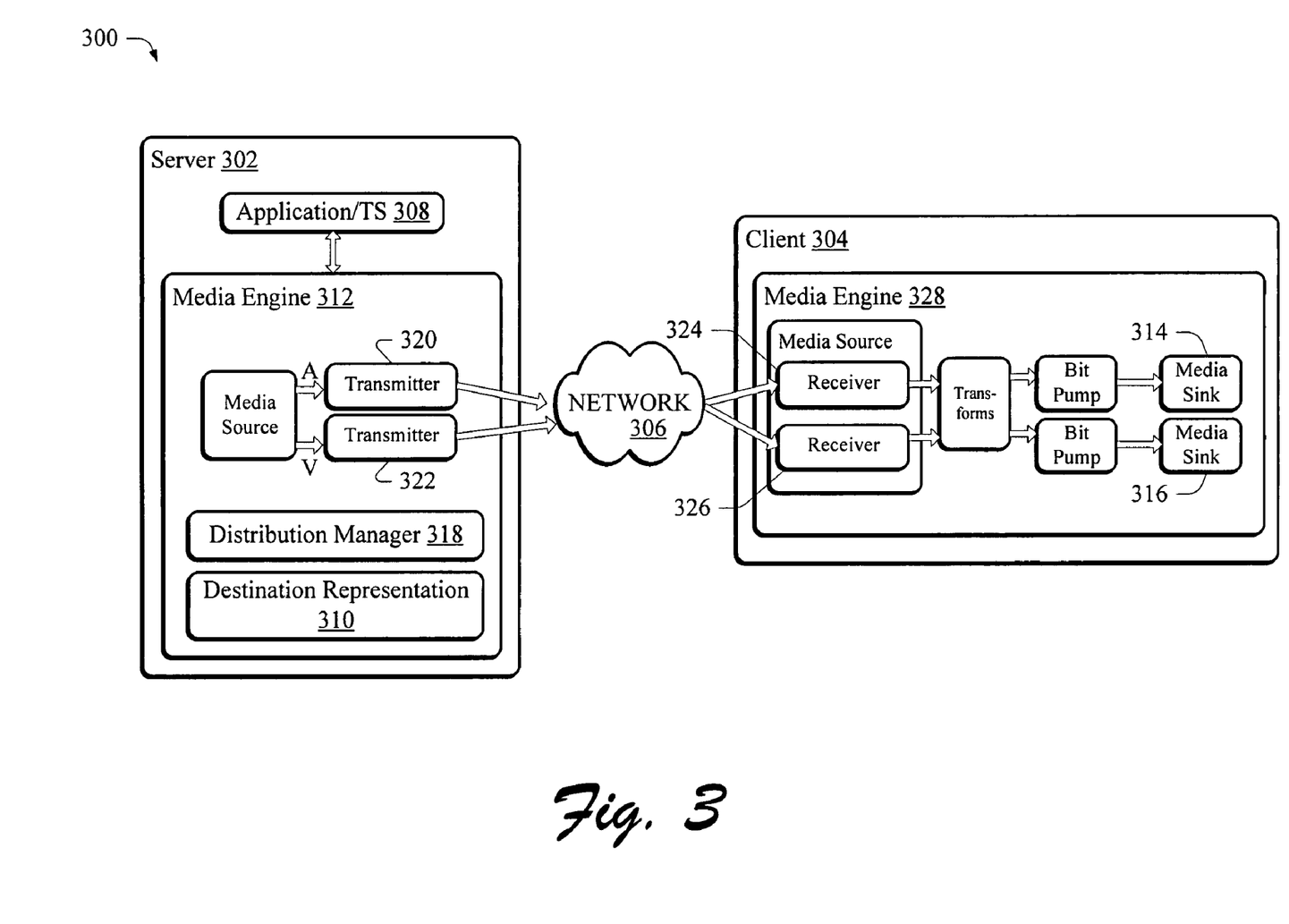
FIG. 3 is an illustration of an exemplary implementation of a system showing a distributed topology.

The topology 230 may be provided in a variety of different environments, such as in a local environment provided by a single computing device and in a distributed environment provided by a plurality of computing devices. The distribution manager 120 is utilized to set up connections between the software components utilized to communicate the media between the computing devices, further discussion of which may be found in relation to the following figure.

FIG. 3 is an illustration of an exemplary implementation of a system 300 showing a distributed topology. As previously described in relation to FIG. 2, the media engine 208 is capable of presenting audio and video to devices existing on remote machines in addition to device that exist on local machines. One example where this is useful is when an application is using the above described systems while running under a remote desktop application. One particular remote desktop application, and one which serves as the basis of the example described below, is Terminal Services (TS). In Windows XP®, an exemplary application is the Remote Desktop Connection application. It is to be appreciated and understood that the concepts described just below can be employed in connection with different remote applications without departing from the spirit and scope of the claimed subject matter.

In the Terminal Services (TS) case, the user is typically physically sitting at the console of a TS client, while running the application from a TS server machine. Media that is to be played in this example is sourced from the TS server, but is sent over a network to the TS client for rendering.

In accordance with the described embodiment, the media engine is configured to send compressed data over the network, in distributed scenarios, and the work of decompression and rendering is conducted entirely on the machine where rendering is to take place, in other words at the TS client itself. This allows high-quality content to be played remotely over any particular network connection. It also ensures that the media content presented to the user goes through the same components (e.g., decoders, renderers, and so on), as is does in the regular local playback scenario.

An exemplary scenario in which remote presentations can be rendered is shown in FIG. 3. The system 300 includes a server 302 and one or more clients an exemplary one of which is shown at 304. Server 302 and client 304 are communicatively linked via a network 306 as indicated. The network 306 can include any suitable network such as, for example, the Internet. In this particular described embodiment, some of the components are the same as or similar to components discussed above. Accordingly, for the sake of brevity, some of the components are not described again.

In this example, an application 308 on the server 302 creates a destination representation 310 as previously described. The application 308, for instance, may call OpenURL on a media engine 312 on the server 302 and provide the destination representation 310. The media engine 312 creates a partial topology, as previously described, and asks the destination representation 310 for media sinks. The destination representation 310 then queries Terminal Services and finds out that the presentation is to take place in connection with a distributed scenario. Information is returned that indicates that the media sinks 314, 316 are to be located on a remote machine, in this instance across the network 306 on the client 304.

The media engine 312 gives the partial topology to a distribution manager 318 to determine whether distribution is needed, and if so, to distribute the topology between the local and remote machines. For each media stream that is to be remoted, the distribution manager 318 performs a number of tasks. First, the distribution manager 318 creates network transmitters 320, 322 on the local topology which will send the compressed media samples over the network 306 to the client 304 where the samples will be rendered. As noted, a network transmitter 320, 322 may be created for each stream as shown in FIG. 3. It is to be appreciated that the network transmitters 320, 322 are also media sinks. Thus, local software components on the server 302 may treat the transmitters as regular sinks and will not need to do anything special with regard to being in a distributed scenario.

Next, the distribution manager 318 causes network receivers to be placed on the remote topology on the client 304. Exemplary network receivers are shown at 324, 326 respectively. The network receivers 324, 326 receive the compressed media samples from the local transmitters 320, 322 on the server 302, and send them downstream for rendering by the media sinks 314, 316. It is to be appreciated and understood that the network receivers 324, 326 may be treated as media sources such that the software components on the client 304 treats the network receivers 324, 326 as regular media sources without needing to know that the pipeline is running in a distributed scenario. Thus, for each remote computing device involved, e.g. the client 304, the distribution manager 318 creates a media engine 328 on the remote machine and gives it the network receivers 324, 326 that the media engine 328 utilizes to pull data that is to be rendered. At this point, the distributed topology is set up, and all machines are ready to start presenting media.

The application 308 on the server 302 can then call start on the media engine 310. The media engine 308 then starts its local media pipeline, e.g. software components of the topology located on the server 302, and calls start on the distribution manager 318 which, in turn, calls start on each of the media engines (e.g., media engines 312, 328) on both the sever 302 and client 304. This causes the media engine 328 on the client 304 to start its own media pipeline(s). Once all media pipelines are running, media is streamed from the media source on the server 302 through the network transmitters 320, 322 and receivers 324, 326 to the eventual audio and video renderers on the client 304. Thus, the application 308 does not have to behave differently between the distributed and local scenarios. The same can be said of the media source.

Exemplary Procedures

The following discussion describes redirection of streaming media that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Figure 4:
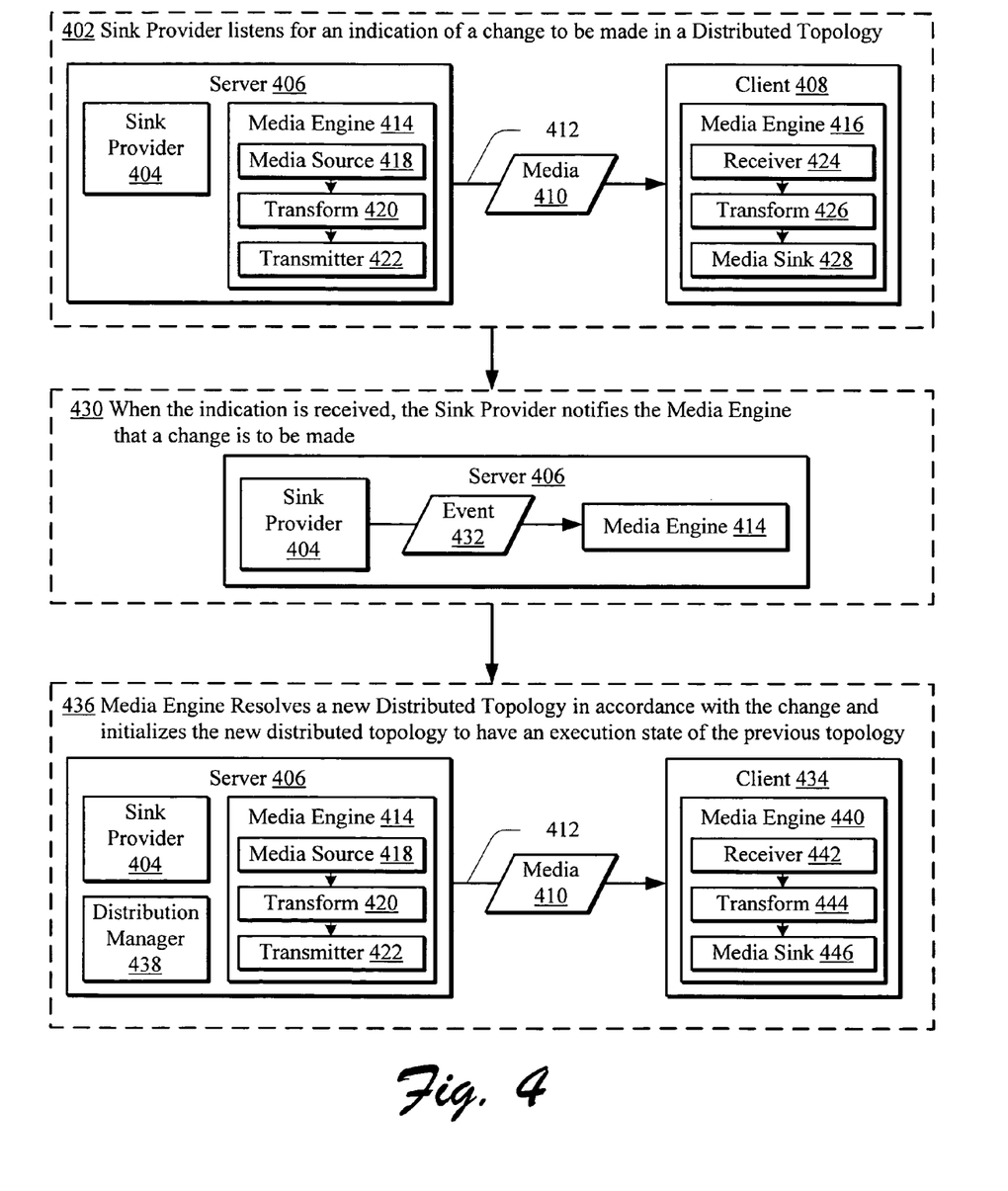
FIG. 4 is a flow diagram depicting a procedure in an exemplary implementation in which a distributed topology is reconfigured based on a notification indicating that a change is to be made to the distributed topology.

FIG. 4 is a flow diagram depicting a procedure 400 in an exemplary implementation in which a distributed topology is reconfigured based on a notification indicating that a change is to be made to the distributed topology. At block 402, a sink provider 404 listens for a notification that indicates that a change is to be made in a distributed topology of software components. The software components are distributed such that one or more of the software components is located on a server 406 and one or more of the software components is located on a client 408. When executed, the software components that are located on the server 406 and the client 408 are capable of streaming media 410 over a network 412. The network 412 may be configured in a variety of ways, such as a wide area network (e.g., the Internet), a local area network (e.g., an Ethernet), a wireless network, and so forth.

In the illustrated implementation of FIG. 4, the distributed topology includes a media engine 414 that is executed on the server 406 and a media engine 416 that is executed on the client 408. The media engine 414 on the server 406 is utilized to create and/or control the software components of the topology that are on the server 406, such as a media source 418, a transform 420, a transmitter 422, and so on. Likewise, the media engine 416 located on the client 408 may be utilized to control the software components that are located on the client 408, such as a receiver 424, a transform 426, and a media sink 428. The media engine 414 located on the server 406 may communicate with the media engine 416 located on the client 408 to control the overall topology.

As previously described, the transmitter 422 may be viewed by other software components that are located on the server 406 as a media sink such that the other software components are not "aware" that the media 410 is being streamed over the network 412. Similarly, the receiver 424 may be viewed by other software components located on the client 408 as a media source such that the other software components are not aware that the media 410 was streamed over the network 412 to the client 408. Thus, the transmitter 422 and receiver 424 may provide network capabilities to local software components that would not otherwise support the network capabilities.

At block 430, when the indication is received by the sink provider 404, the sink provider 404 communicates an event 432 to the media engine 414 that indicates that a change is to be made in the topology. A variety of changes may be made to the topology, such as to change from a distributed topology to a local topology, to include an additional media sink, to remove an existing media sink, to render the topology on a different computing device, and so on. Further discussion and exemplary changes to the topology may be found in relation to FIG. 6.

In the illustrated implementation of FIG. 4, the change is to redirect the streaming media 410 from the client 408 to another client 434 that is communicatively coupled to the server 406 over the network 412. Therefore, at block 436, the media engine 414 resolves a new distributed topology of software components that are capable of streaming the media 410 from the server 406 to the other client 434. The distribution manager 438, when executed on the server 406, sets up connections between software components that are utilized to stream data from the server 406 to the other client 434. The distribution manager 438, for instance, may be executed to setup a remote media engine 440 on the other client 434, which may then be utilized to create the transform 442, media sink 444, and so on, to resolve the distributed topology as previously described in relation to FIG. 3. Therefore, the distribution manager 438, although illustrated separately, may be thought of as a part of the media engine 414 that is utilized to resolve and control a distributed topology of software components.

The distribution manager 438 may also be executed to initialize the reconfigured topology to have an execution state that matches the execution state of the topology at block 430 of when the indication was received. The execution state is relative to the streaming of the media 410 that was performed by the software components. A variety of characteristics may be utilized to describe the execution state relative to the streaming of the media 410, such as a pause, a stop, fast forward, rewind, slow motion, position in the streaming of the media (e.g., at point "X" in a media stream having a duration "y" when output), and so on.

The distribution manager 438, for instance, may monitor the state of the software components during execution. When the topology is reconfigured, the distribution manger 438 may then be utilized to initialize the remote media engine 440 to an execution state that matches the monitored execution state at block 430. For example, the distribution manger 438 may cause the remote media engine 440 to be in a "started" execution state (i.e., ready to handle the streaming media) because the topology was reconfigured while media was being streamed. Therefore, the reconfigured topology may continue the streaming of the media 410 so that the interruption to the user's viewing experience is minimized. Further discussion of initialization of a reconfigured topology may be found in relation to the following implementation.

Figure 5:
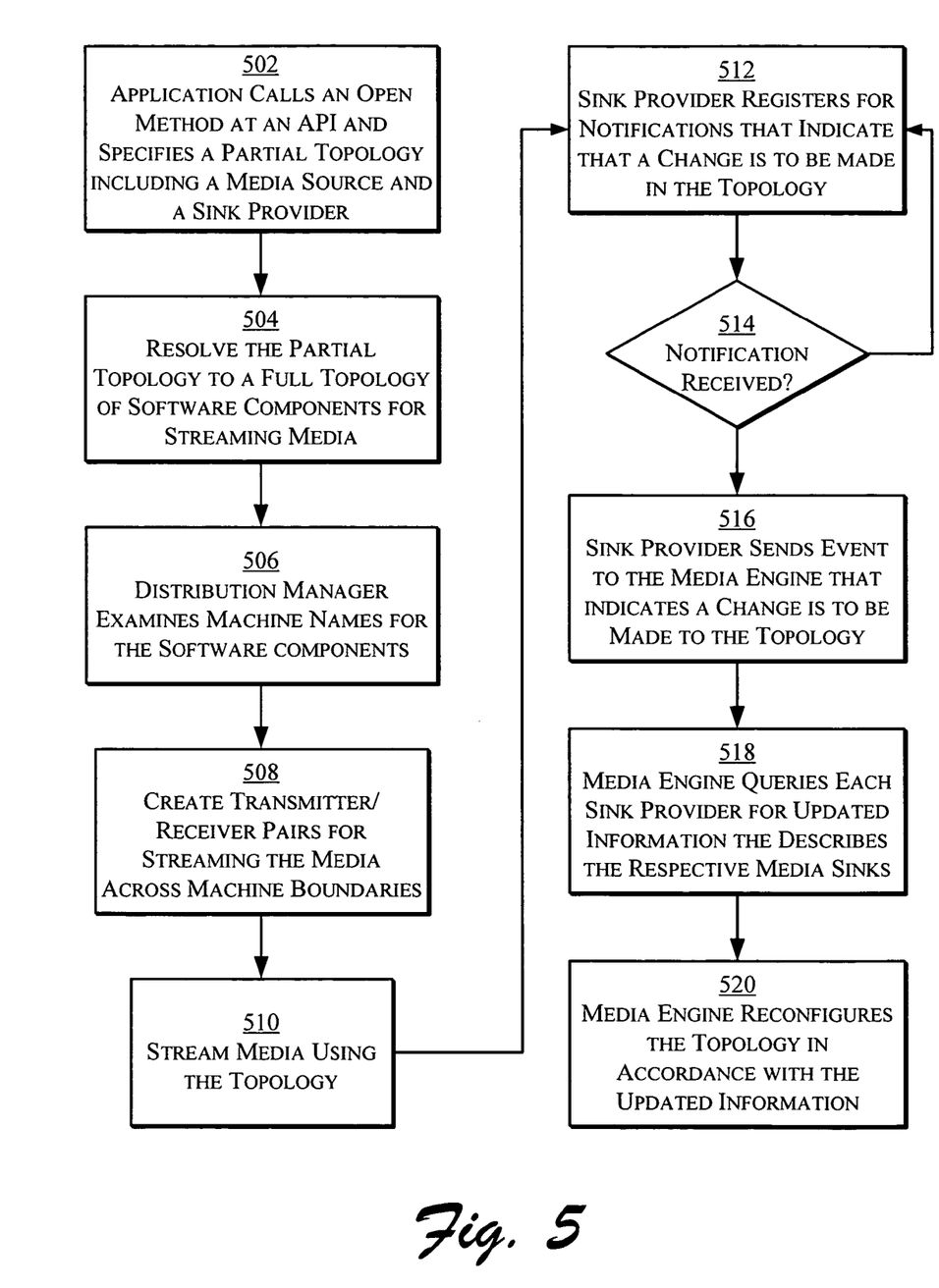
FIG. 5 is a flow diagram depicting a procedure in an exemplary implementation in which an application communicates an indication that causes streaming media to be redirected.

FIG. 5 is a flow diagram depicting a procedure 500 in an exemplary implementation in which an application communicates an indication that causes streaming media to be redirected. At block 502, a media foundation based application (e.g., an application configured to communicate with the media foundation 204 of FIG. 2) calls an open method on a media engine and specifies a media source and a sink provider. The sink provider, as previously described, describes a destination for the streaming media such that the media engine may construct a media sink. In another implementation, the sink provider is provided automatically by the media foundation, such as by providing a predefined default destination for the stream of media.

The sink provider, for instance, can specify not only the media sink(s) that samples from a particular media stream should be sent to, but also on which machine (i.e., client) the media sink(s) are located. For example, the sink provider may be aware of terminal service (TS) sessions as previously described in relation to FIG. 3. When a client is connected to a server via a TS session, the sink provider executing on the server may specify that media should be streamed directly to media sinks on the client.

At block 504, the partial topology is resolved to a full topology that is capable of streaming media. For example, as previously described in relation to FIG. 3, software components, such as transforms, transmitters, receivers, and so on, may be provided by the media engine such that media may be streamed and rendered. The media steams may be provided locally on a single computing device or distributed across a plurality of computing devices. For instance, at block 506 the distribution manager examines the machine names for software components (e.g., the media sink described by the sink provider and the media source) to determine if the topology is to be distributed across a plurality of computing devices. At block 508, transmitter/receiver pairs are created that, when executed, are capable of streaming media across a network. Once the partial topology is resolved (i.e., a full topology is created), media is streamed from the server to the client (block 510).

At block 512, the sink provider registers for notifications that indicate that a change is to be made to the topology. For instance, the sink provider may register with an operating system to receive notifications which indicate a change in where media is to be streamed, and so on. Therefore, at decision block 514, the sink provider determines whether a notification has been received from the operating system which indicates that a change is to be made to the topology. The sink provider may also be aware of TS session changes, so when a client connects to a server via a TS or disconnects from a TS, the sink provider is aware of the change.

The sink provider may be notified of the change in a variety of ways. For example, the sink provider may be notified of TS session changes via a notification manager. The notification manager is a software component that any other software component of the media foundation can use to be notified of TS session changes as the changes happen. The notification manager listens to TS session change events from a number of named events that are defined in a registry, which TS will signal whenever there is a change in the current session.

If a notification has been received from the TS application, the operating system, and so on (block 514), the sink provider indicates the change by firing a "destination changed" event to the media engine (block 516). In response to the event, the media engine queries each sink provider for updated information regarding its respective media sinks (block 518), and the topology is reconfigured accordingly (block 520). The destination changed event can also be used to handle cases where the user shifts from one TS client to another, when a user is added or removed from a list of users connected to a TS session from a client (local or remote), and so on, further discussion of which may be found in relation to FIG. 6. For example, although a change in destination was described in relation to FIG. 5, a variety of changes to the topology may be encountered, such as a change in a media source, a change to transforms, and so on.

Figure 6:
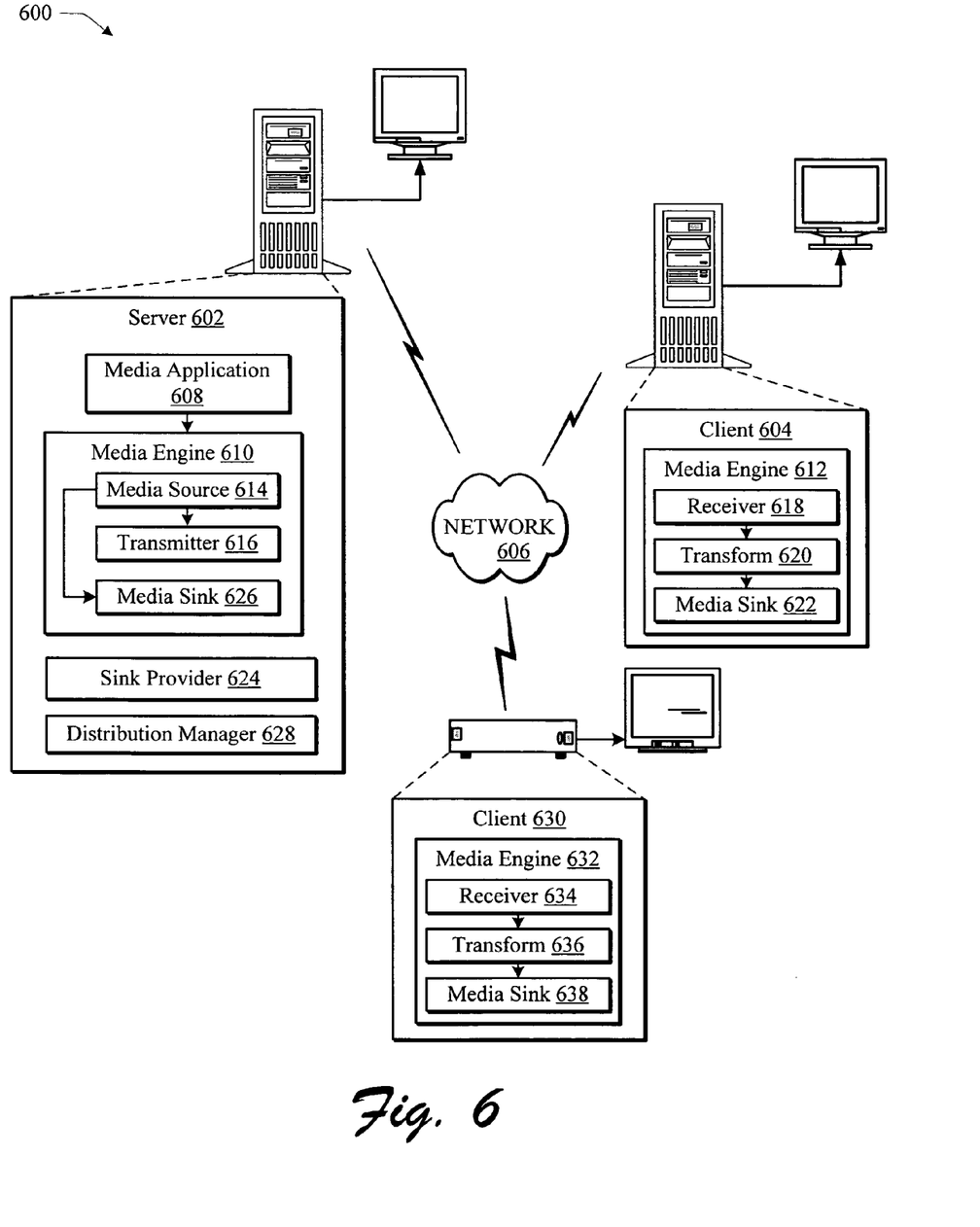
FIG. 6 is an illustration of a system in an exemplary implementation in which streaming media is directed.

FIG. 6 is an illustration of a system 600 in an exemplary implementation in which streaming media is directed. As previously described, streaming media may be directed in a variety of ways. For example, a server 602 may be communicatively coupled to a client 604 over a network 606. A media application 608 is in communication with a distributed topology to stream media from the server 602 to the client 604. A user, for instance, may log onto the server 602 from the client 604 and utilize the media application 608 in a terminal session such that execution of the media application 608 occurs at the server 602 and media resulting from the execution is streamed to the client 604 for display to the user, such as graphical data depicting a desktop. The distributed topology includes a media engine 610 located on the server 602 that is in communication with a media engine 612 located on the client 604. Thus, the media engine 610 may control software components located at the server 602 (e.g., a media source 614 and a transmitter 616) as well as software components located on the client 604 (e.g., a receiver 618, a transform 620, and a media sink 622).

If the user at the client 604 terminates the TS session, the streaming media may be redirected for local rendering on the server 602. For instance, the sink provider 624 may receive a notification that the TS session has been terminated and that the streaming media is to be rendered locally. In response to the notification, the sink provider 624 communicates a "destination changed" event to the media engine 610. The media engine 610, in response to the event, queries the sink provider 624 to learn the new destination for the streaming media, which in this case is local on the server 602. Therefore, the sink provider 624 provides the media engine 610 with the information needed to construct the media sink 626 locally on the server 602. Additionally, the distribution manager 628 may be utilized to initiate the new local topology to the execution state of the previous distributed topology such that the streaming media may be output as before.

In another example, the distribution manager 628 may also monitor a local topology such that a distributed topology reconfigured form the local topology may be initiated to have an execution state the matches the execution state of the local topology. For instance, the distribution manager 628 may be aware of the execution state of the local topology even when media is not being remoted (e.g., the media is being streamed locally for playback using the media engine 610, the media source 614 and a media sink 626). This information allows the distribution manager 628 to initialize the remote media engine (e.g., media engine 612) to the matching execution state once it is created. For instance, if a user is streaming media locally for playback at the server 602 and during playback switches to a TS connection, the distribution manager 628 will not only create the media engine 612 on the client 604, but also tell the media engine 612 that it needs to be in a "started" execution state because the previous topology was streaming media when the session change took place.

In a further example, the user may switch from the client 604 to another client 630 that is communicatively coupled to the server 602 over the network 606. The user, for instance, may utilize the client 604 that communicates with the server 602 in a TS session as described in the previous example. The user may then move to the other client 630 and initiate a new TS session with the media application 608 and supply a new destination representation for the streaming media through the media application 608 (e.g., by supplying data to the sink provider that specifies the new destination for the streaming media). The sink provider sends a "destination changed" event to the media engine 610 which causes the media engine 610 to query the sink provider to determine which change is to be made to the topology. In this example, the change is to redirect the streaming data to the other client 630. Therefore, the media engine 610, through the distribution manager 628, creates the media engine 632 on the client 630. The media engine 632 creates software components that are local to the other client 630 and that enable the other client 630 to render the streaming media, such as by creating a receiver 634, a transform 636, a media sink 638, and so on. As before, the distribution manager 628 may also be utilized to initiate the new distributed topology that includes the client 630 to have an execution state that matches the execution state of the previous distributed topology.

Although the previous examples described the redirection of streaming media from one destination to another destination, other software components of the topology may also be added/changed to handle streaming media, such as to add/remove transforms, add/remove media sources, and so on.

CONCLUSION

The systems and architecture described herein allow for dynamic changes in sourcing, handing, and/or rendering of media between local and remote machines. Additionally, dynamic changes may be made in the rendering of some media stream types (e.g. audio) from one machine to another while leaving the rendering of other media stream types (e.g. video) unchanged. Finally, the systems and architecture allow dynamic adding and removing of machines, such as to allow users on multiple machines (local and remote) to view the same media at the same time.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    listening at an application programming interface for a notification indicating that a change is to be made in a topology of streaming media software components, wherein the change includes at least one of adding or removing one or more streaming media software components to the topology;
    when the notification is received, notifying a media engine, wherein:
        the media engine is capable of reconfiguring the topology in accordance with the indicated change to form a reconfigured topology; and
        at least one of the topology or the reconfigured topology has:
            one streaming media software component located on a computing device; and another streaming media software component located on another computing device;
    registering to receive the notification from an operating system via a notification manager, wherein the notification manager listens to change events from a plurality of named events defined in a registry signaling a change is to be made in a topology streaming media software component; and
    initializing the reconfigured topology to have an execution state relative to streaming media that matches an execution state of the topology when the notification was received.

2. The method as described in claim 1, wherein the change includes at least one of adding or removing one or more said streaming media software components to the topology that render streaming media.

3. The method as described in claim 1, wherein the change includes at least one of adding or removing one or more streaming media software components to the topology that source streaming media.

4. The method as described in claim 1, wherein the change includes at least one of adding or removing one or more streaming media software components to the topology that handle streaming media.

5. The method as described in claim 1, wherein the topology of streaming media software components include:
    one or more media sources individual ones of which serving as a source of streaming media;
    one or more transforms communicatively linked with the one or more media sources and configured to handle the streaming media from the one or more media sources; and
    one or more media sinks configured to sink the streaming media from the one or more transforms.

6. The method as described in claim 1, wherein each said execution state includes execution characteristics that relate to the streaming media and are selected from the group consisting of: start; pause; stop; fast forward; rewind; slow motion; and position in the streaming media.

7. One or more computer readable storage media comprising computer executable instruction that, when executed on a computer, direct the computer to perform the method as described in claim 1.

8. A method comprising:
    listening at an application programming interface for a notification indicating that a change is to be made to a first topology of software components, wherein the change includes at least one of adding or removing one or more streaming media software components to the first topology and wherein the first topology of software components is capable of streaming media and has an execution state relative to the streaming media;
    registering to receive the notification from an operating system via a notification manager, wherein the notification manager listens to change events from a plurality of named events defined in a registry signaling a change is to be made in a topology streaming media software component;
    reconfiguring the first topology in accordance with the indicated change to form a second said topology; and
    initializing the second said topology to have an execution state that matches the execution state of the first topology, wherein at least one of the first or the second said topology have said software components that are distributed on a plurality of computing devices and wherein each said execution state includes execution characteristics that relate to the streaming media and are selected from the group consisting of:
    start;
    pause;
    fast forward;
    rewind;
    slow motion; and
    position in the streaming media.

9. The method as described in claim 8, wherein the plurality of computing devices is communicatively coupled via a network.

10. The method as described in claim 8, wherein the at least one of the first or second topology have said software components that are distributed on a plurality of computing devices such that: one said software component is located on a first said computing device; and another said software component is located on a second said computing device.

11. One or more computer readable storage media comprising computer executable instruction that, when executed on a computer, direct the computer to perform the method as described in claim 8.

* * * * *